United States Patent
Karim et al.

(10) Patent No.: US 12,518,855 B2
(45) Date of Patent: Jan. 6, 2026

(54) SYSTEMS AND METHODS FOR PROVIDING A DISTRIBUTED PLATFORM WITH MICRO-RANDOMIZED TRIALS

(71) Applicant: Optum, Inc., Minnetonka, MN (US)

(72) Inventors: Fazle Shahnawaz Muhibul Karim, Chicago, IL (US); Gabriela Chiribau, Gresham, OR (US); Ayush Tomar, Morgan Hill, CA (US); Spencer Tyler Ha, Revere, MA (US); Ketki Savle, Atlanta, GA (US); Laura D. Hamilton, Chicago, IL (US)

(73) Assignee: Optum, Inc., Minnetonka, MN (US)

( * ) Notice: Subject to any disclaimer, the term of this patent is extended or adjusted under 35 U.S.C. 154(b) by 266 days.

(21) Appl. No.: 18/342,964

(22) Filed: Jun. 28, 2023

(65) Prior Publication Data

US 2025/0006315 A1    Jan. 2, 2025

(51) Int. Cl.
*G16H 10/20* (2018.01)
*G16H 10/60* (2018.01)
*G16H 40/20* (2018.01)

(52) U.S. Cl.
CPC ............ *G16H 10/20* (2018.01); *G16H 10/60* (2018.01); *G16H 40/20* (2018.01)

(58) Field of Classification Search
CPC ......... G16H 10/20; G16H 10/60; G16H 40/20
See application file for complete search history.

(56) References Cited

U.S. PATENT DOCUMENTS

| | | |
|---|---|---|
| 10,373,064 B2 | 8/2019 | Mascaro et al. |
| 10,528,973 B2 | 1/2020 | Marlow et al. |
| 10,621,597 B2 | 4/2020 | Mascaro et al. |
| 11,354,376 B2 | 6/2022 | Catlin et al. |
| 2018/0341873 A1 | 11/2018 | Fellows |

(Continued)

FOREIGN PATENT DOCUMENTS

WO    2020257563 A1    12/2020

OTHER PUBLICATIONS

HealthSense Software-defined Mobile-based Clinical Trials (Year: 2019).*

(Continued)

*Primary Examiner* — Chinyere Mpamugo
(74) *Attorney, Agent, or Firm* — Bookoff McAndrews, PLLC

(57) ABSTRACT

A distributed messaging platform may employ a trial system to provide a micro-randomized trial by identifying, over an electronic network, a plurality of user devices associated with a plurality of subjects; and at each of a plurality of intervals, and assigning the subjects into a respective distribution over a plurality of cohorts, such that the subjects are re-assigned at each fixed interval. The trial system may further perform operations that include, for each cohort, causing a respective subset of the user devices associated with subjects assigned to the cohort to output a respective treatment, the treatment for each cohort being different from each other; and collecting, from the user devices, response data of the subjects; such that, as the subjects are re-assigned to different cohorts across the different intervals, the user devices output different treatments corresponding to the different cohorts.

20 Claims, 5 Drawing Sheets

(56) References Cited

U.S. PATENT DOCUMENTS

2021/0142357 A1  5/2021  Truong et al.
2021/0217516 A1  7/2021  Nash et al.

OTHER PUBLICATIONS

Microrandomized Trials: Developing Just-in-Time Adaptive Interventions for Better Public Health (Year: 2023).*
IntelligentPooling: Practical Thompson Sampling for mHealth (Year: 2021).*
"AB Testing Functionality in Multi Step Campaign," Oracle, last updated on Jan. 26, 2017, retrieved from https://community.oracle.com/topliners/discussion/4387332/ab-testing-functionality-in-multi-step-campaign (16 pages).
"Multi-stage campaigns," Optimizely, no date but last updated in 2021, retrieved from https://support.optimizely.com/hc/en-us/articles/4413200592525-Multi-stage-campaigns (4 pages).
Lee et al., Use of research electronic data capture (REDCap) in a sequential multiple assignmet randomized trial (SMART): A practical example of automating double randomization, 2023, Research Square, rs.3.rs-2573133. (Year: 2023).

* cited by examiner

SYSTEMS AND METHODS FOR PROVIDING A DISTRIBUTED PLATFORM WITH MICRO-RANDOMIZED TRIALS

TECHNICAL FIELD

Various embodiments of this disclosure relate generally to a distributed messaging platform, and, more particularly, to systems and methods for providing micro-randomized trials.

BACKGROUND

In many situations, testing is performed to evaluate performance between different options. For example, different treatments may be evaluated for effectiveness, different messages may be evaluated for engagement, etc. Conventionally, such options may be evaluated via a trial procedure such as A/B testing, multi-variate testing, or the like.

However, such conventional trial procedures may be sub-optimal, may not be adapted to a particular situation, or may be associated with undesirable effects. For example, in trials involving providing different options to people, the subjects of the trial are generally divided up into cohorts, and then are locked into their respective cohort for the extent of the trial. Although, during the trial, it may become evident that one option is more or less preferable than others. However, since subjects are locked in, they may be locked into an un-desirable option for the full extent of the trial. Moreover, conventional A/B or multi-variate testing generally takes a significant amount of time to acquire statistically relevant data, which may thus prolong the negative experience of some subjects.

This disclosure is directed to addressing above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for providing a distributed messaging platform, e.g., that is usable to provide a micro-randomized trial. Conventional trial procedures have been used to evaluate different options, such as evaluating performance of an existing option or control against a new option or change. However, such conventional trial procedures like A/B testing, multi-variate testing, or the like, generally lock subjects into one option for the extent of the trial, and also generally require a significant amount of time in order to gather statistically relevant data. This may result in subjects being locked into a less preferable option during the extent of the trial. Such conventional trial procedures may also not account for or provide analysis of time-varying contextual factors that may impact the effectiveness or preferability of different options over time.

Accordingly, improvements in technology relating to trials are needed. As will be discussed in more detail below, in various embodiments, a distributed messaging platform is used to provide a micro-randomized trial that periodically re-buckets subjects into different cohorts over the course of a trial.

According to certain aspects of the disclosure, methods and systems are disclosed for providing a distributed messaging platform, e.g., for providing micro-randomized trials.

In one aspect, a distributed messaging platform for providing a micro-randomized trial may include: at least one trial system that includes: at least one memory storing instructions; and at least one processor operatively connected to the at least one memory, and configured to execute the instructions to perform operations for executing the micro-randomized trial, including: identifying, over an electronic network operatively connected to the at least one trial system, a plurality of user devices that are associated with a plurality of subjects for a micro-randomized trial; and at each of a plurality of fixed intervals: assigning the plurality of subjects into a respective distribution over a plurality of cohorts, such that the plurality of subjects are re-assigned at each fixed interval; for each cohort, causing a respective subset of the user devices associated with subjects assigned to the cohort to output a respective treatment, the treatment for each cohort being different from each other; and collecting, from the plurality of user devices, response data of the plurality of subjects; such that, as the plurality of subjects are re-assigned to different cohorts across the plurality of fixed intervals, the user devices of the plurality of subjects output different treatments corresponding to the different cohorts.

In another aspect, a computer-implemented method of using a distributed messaging platform to provide a micro-randomized trial may include: identifying, over an electronic network, a plurality of user devices that are associated with a plurality of subjects for a micro-randomized trial; and at each of a plurality of fixed intervals: assigning the plurality of subjects into a respective distribution over a plurality of cohorts, such that the plurality of subjects are re-assigned at each fixed interval; for each cohort, causing a respective subset of the user devices associated with subjects assigned to the cohort to output a respective treatment, the treatment for each cohort being different from each other; and collecting, from the plurality of user devices, response data of the plurality of subjects; such that, as the plurality of subjects are re-assigned to different cohorts across the plurality of fixed intervals, the user devices of the plurality of subjects output different treatments corresponding to the different cohorts.

In a further aspect, a non-transitory computer-readable medium comprising instructions for using a distributed messaging platform to provide a micro-randomized trial, the instructions executable by at least one processor to perform operations. The operations may include: identifying, over an electronic network, a plurality of user devices that are associated with a plurality of subjects for a micro-randomized trial; and at each of a plurality of fixed intervals: assigning the plurality of subjects into a respective distribution over a plurality of cohorts, such that the plurality of subjects are re-assigned at each fixed interval; for each cohort, causing a respective subset of the user devices associated with subjects assigned to the cohort to output a respective treatment, the treatment for each cohort being different from each other; and collecting, from the plurality of user devices, response data of the plurality of subjects; such that, as the plurality of subjects are re-assigned to different cohorts across the plurality of fixed intervals, the user devices of the plurality of subjects output different treatments corresponding to the different cohorts.

It is to be understood that both the foregoing general description and the following detailed description include examples and are explanatory only and are not restrictive of the disclosed embodiments, as claimed.

BRIEF DESCRIPTION OF THE DRAWINGS

The accompanying drawings, which are incorporated in and constitute a part of this specification, illustrate various example embodiments and together with the description, serve to explain the principles of the disclosed embodiments.

DETAILED DESCRIPTION OF EMBODIMENTS

Figure 1:
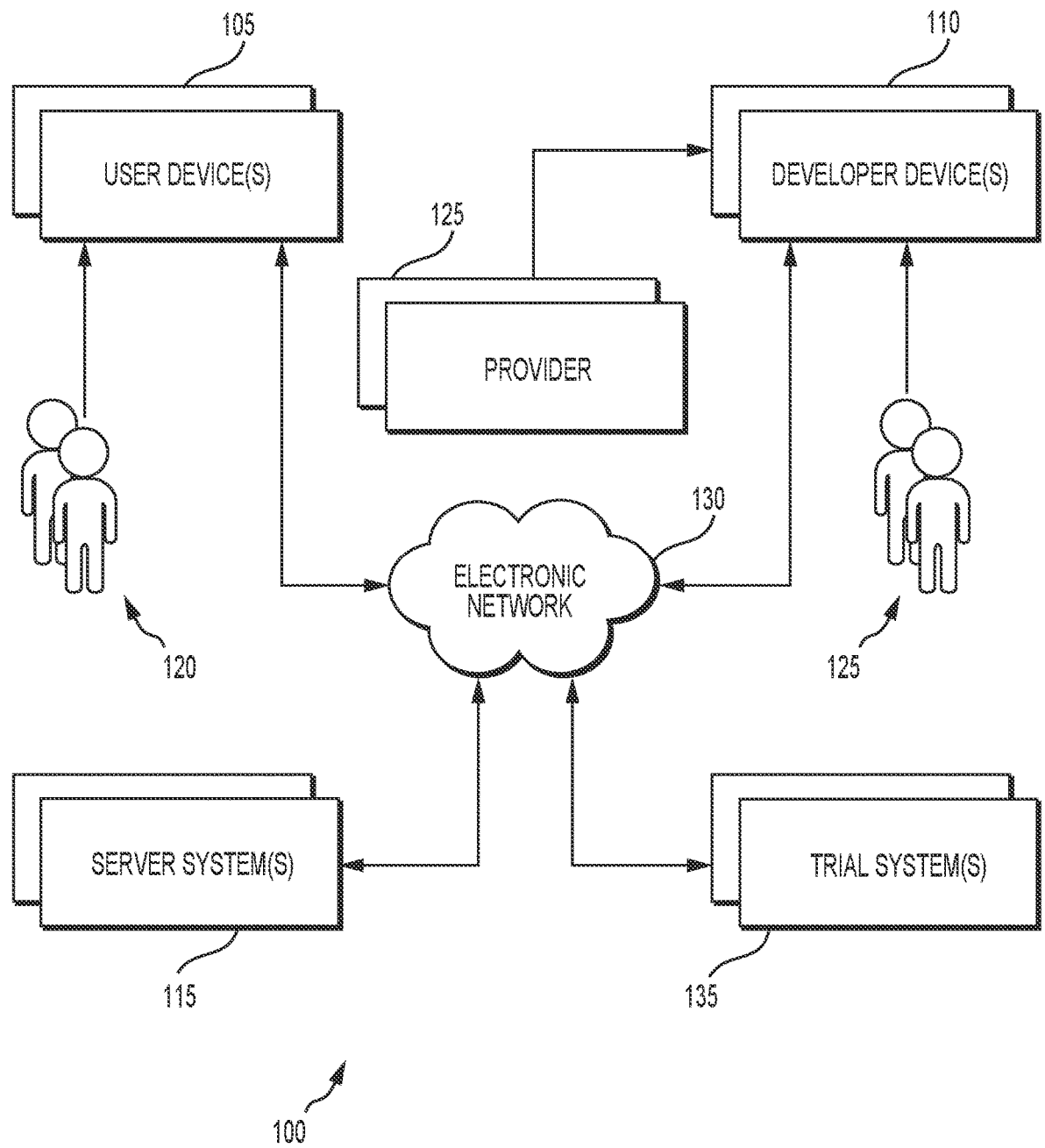
FIG. 1 depicts an example environment for a distributed messaging platform usable to provide a micro-randomized trial, according to one or more embodiments.

Examples in this disclosure are made with reference to different options of subjects with regard to medical treatments, interventions, recommendations, etc. However, it should be understood that reference to any particular activity is provided in this disclosure only for convenience and as an example, and not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially" and "generally," are used to indicate a possible variation of ±10% of a stated or understood value.

It will also be understood that, although the terms first, second, third, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The term "provider" generally encompasses an entity or agent thereof involved in providing goods or services to a person, e.g., healthcare to a patient. The term "treatment" generally encompasses application of an option in a trial to a subject. In other words, a "treatment" need not be medical in nature, although medical treatments such as interventions, prescriptions, etc. are contemplated as examples of possible options for inclusion in a treatment. Terms like "subject," "user," "patient," or the like generally encompasses a person or entity that is provided with a treatment during the course of a trial.

One or more aspects of this disclosure pertain to a platform of a distributed messaging platform for conducting micro-randomized trials. Such trials may be provided, for example, in a scalable, efficient, and statistically rigorous manner. A platform, according to one or more aspects of this disclosure, may leverage modern computing technologies to assign and periodically re-assign subjects to different treatment cohorts, deliver treatments to subjects, and collect response data, e.g., in real-time. Such operation may enable researchers to rapidly evaluate multiple interventions and determine which are most effective at promoting behavioral change.

In an example use case, an entity may desire to provide a distributed messaging platform that delivers effective messages for its users. For example, various applications may include a platform for providing push notifications at various times of the day to encourage users to eat healthy snacks, to get active and interrupt a sedentary period, to take a proper medication at a prescribed time, to engage in mindfulness activities to reduce stress at various times of the day and with various messages, to encourage users to maintain proper levels of hydration, etc. These types of applications drive both near-term outcomes (e.g., an increased step count and medication adherence rate in the hour following the notification) as well as long-term outcomes (e.g., weight, blood pressure, and/or other health outcome measures). A conventional trial may divide subjects into different cohorts, e.g., one group for each of a plurality of different messaging procedures, and then evaluate outcomes for each group at the end of the trial.

As noted above, conventional trial procedures may be sub-optimal, may not account for all factors, and/or may not be applicable to certain situations. For instance, conventional trial procedures may not be able to provide results until the end of a lengthy trial process, and moreover may lock subjects into undesirable options for the extent of the trial. Further, with conventional trial procedures, statistically significant improvement in long term health outcomes with a new treatment may be determined, but such approaches may not be adapted to understanding which specific components of the application of a treatment were impactful, and which were irrelevant or even deleterious.

To conduct a micro-randomized trial, according to one or more aspects of this disclosure, each subject is periodically distributed or re-distributed into a different cohort. This period redistribution enables measuring the effect of a given treatment, e.g., a particular messaging procedure, on near-term engagement (such as within the next hour or within the next day). Such an approach may also improve a rate of elicited behavioral change and/or improved health outcomes. Moreover, such procedures may enable the platform to reach results with statistical significance faster and/or with fewer subjects compared to conventional trial procedures.

In an example, consider a scenario where a fitness tracking app developer wants to test the effect of two different types of motivational messages on user engagement. The app currently sends a push notification every morning to remind users to perform a workout, but the developer wants to test whether users respond better to messages that are provided at a time of day shortly prior to a time that the users previously reported performing a workout. A platform for performing a micro-randomized trial, according to one or more aspects of this disclosure, may determine how many subjects are needed for a micro-randomized trial, e.g., based on history of engagement rates for reminder messages, a desired level of statistical significance in the results, the number of different messaging procedures to be tested, etc., and may identify as subjects devices having the fitness tracking app installed that are associated with at least the determined amount of users. The platform may distribute the subjects across different cohorts corresponding to the different options to be tested. The platform may obtain a period of time for a refresh rate for the distribution of subjects, e.g., daily, weekly, monthly, etc. For example, this period may be set by the developer, preset, and/or determined based on characteristics of the trial such as sample size, extent of time related to near-term and long-term results, etc. In this example, the period may be daily, a near-term result may include whether the subject performed a workout on that day, and a long-term result may include average likelihood to perform a workout per day or a workout rate over a longer period of time, etc. Over the course of a first iteration of the period, the platform may cause each subject's user device to output one or more messages according to the messaging protocol corresponding to that subject's assigned cohort. At each successive period, the subjects may be re-distributed across the different cohorts, such that the messaging protocol followed for a particular subject may change in response to that subject being moved into a different cohort in a subsequent period.

Throughout the trial, the platform may collect response data from the subject's user devices. For example, the user devices may provide data to the platform, e.g., whether a subject viewed a transmitted message, whether the subject reported doing a workout and when, etc. The platform may also record other data, such as whether the subject's device was available for receiving messages when messages were sent, etc., that may be collected with or without intervention or interaction from the user device. In an example, response data may be streamed, e.g., to a database or data lake, such that results of the trial may be collected, accessed, and/or analyzed in rear or near-real time (hereafter referred to as "real-time"). Such results data may be used to determine an effectiveness of one or more of the different treatments. In an example, as further results data is collected, the platform may determine whether a sufficient amount of results data for one or more of the treatments has been collected so as to provide statistically significant results regarding treatment effectiveness, e.g., according to the desired value for the trial. In this manner, statistically significant results may be indicated and/or made available as soon as it is possible to do so, e.g., rather than needing to wait for an end of the trial. In an example, the platform may enable early termination of the trial, e.g., to roll out a preferred or more effective option to more or all subjects rather than needing to wait for the conclusion of the trial.

In some cases, the redistribution(s) may be random. In some cases, the redistribution(s) may be configured to gradually bias assignment to cohorts that exhibit more effective results, such that, over the course of the trial, more and more subjects are routed into higher-performing cohorts. One example of such a redistribution procedure is Thompson bandit sampling.

Results for the trial may include, for example, indications of one or more of near-term effectiveness of treatments, long-term effectiveness of treatments, response trends over time, the effect of one or more time-varying factors on engagement rate, or other factors associated with subject responses. For example, the platform may collect data regarding messaging burnout, e.g., data indicative that a subject stopped engaging with the app, e.g., based on a lack of activity, an uninstallation of the app, a change in notification settings, etc., which may be correlated against different treatments or aspects thereof such as frequency of messaging, etc. Results may be output on a user device associated with the developer, stored in a database, analyzed, e.g., using one or more automatic algorithms, etc.

While several of the examples above involve pertain to different messaging apps, it should be understood that techniques according to this disclosure are adaptable to any suitable type of distributed messaging platform. Moreover, the techniques disclosed herein are adaptable to any suitable communications platform. In an example, instead of messages, aspects of a micro-randomized trial may be applied to any suitable treatment, e.g., prescription of medication, service of media or content, advertising, etc. Further, effectiveness may be evaluated with reference to any suitable criteria, e.g., financial transactions or status, actions or activities, location, timing of an event, program or application use, etc. It should also be understood that the examples above are illustrative only.

Presented below are various aspects of implementation of a micro-randomized trial, according to various embodiments.

FIG. 1 depicts an example environment 100 that is utilized with micro-randomized trial techniques presented herein. One or more user device(s) 105, one or more developer device(s) 110, and one or more server system(s) 115 are configured to communicate across an electronic network 130. As will be discussed in further detail below, one or more trial system(s) 135 are configured to communicate with one or more of the other components of the environment 100 across the electronic network 130. The one or more user device(s) 105 is associated with a subject 120, e.g., a person or entity identified for participation in a micro-randomized trial. The one or more developer device(s) 110 is associated with a developer 125, e.g., a person or entity involved in providing the micro-randomized trial.

In some embodiments, one or more of the components of the environment 100 are associated with a common entity, e.g., an insurance provider, a medical care provider such as a hospital, a commercial entity, and advertiser, or the like. In some embodiments, one or more of the components of the environment 100 is associated with a different entity than another. The systems and devices of the environment 100 are configured to communicate in any arrangement. As will be discussed herein, systems and/or devices of the environment 100 are configured to communicate in order to one or more of provide goods or services, e.g., in the form of treatments, to subjects 120, provide a micro-randomized trial, or collect, store and/or analyze data associated with such a trial, among other activities.

The user device 105 is configured to enable the user 120 to access and/or interact with other systems in the environment 100. For example, the user device 105 is a computer system such as, for example, a desktop computer, a mobile device, a tablet, a wearable device such as a fitness tracker, smart watch, etc. In some embodiments, the user device 105 includes one or more electronic application(s), e.g., a program, browser, etc., installed on a memory of the user device 105. In some embodiments, the electronic application(s) is associated with or enable the user 120 to interact with one or more of the other components in the environment 100. For example, the electronic application(s) includes a browser or application configured to receive and output treatments, e.g., messages and/or other media, provided by the server system 115. For example, the user device 105, in some embodiments, includes a User Interface (UI) configured to receive and display push notifications, e.g., an alert such as a pop-up or other message that is generated even when a corresponding program or application is not open or in focus. In some embodiments, a first user device 105, e.g., a fitness tracker, is configured to interact with a second user device 105, e.g., a smartphone. In an example, a smartphone includes an electronic application with a user interface that enables interaction between a user 120 and a program or application operating on a fitness tracker. As used herein, any such combination of devices is considered a user device.

The developer device 110 includes, for example, a user interface that enables the developer 125 to interact with one or more of the components in the environment 100. In an example, the user interface includes one or more interface elements for generating, monitoring, or analyzing a micro-randomized trial or data associated therewith. In an example, the developer device 110 includes a tool or algorithm for one or more operations such as, for example, setting or determining a statistical significance of data, determining a sample size, identifying subjects to be used for a trial, setting parameters for a trial such as trial name, trial start date, number of cohorts, treatments options, assignment of treatment to cohorts, a period of time between redistribution of subjects into the cohorts, determination of dates, frequency, or periods for checking results for statistical significance, etc. In some embodiments, such information is stored in a database or the like, e.g., in a memory of the trial system 135. In some embodiments, the developer device 110 interacts with or is at least partially integrated into the trial system 135. In some embodiments, the developer device 110 includes and/or interacts with an application programming interface (API), e.g., for exchanging data to other systems, e.g., one or more of the other components of the environment such as the trial system 135.

The server system 115, in various embodiments, hosts, implements, track, and/or facilitates services or procedures relating to a good or service to be provided to users 120. In an example, to continue from one of the examples above, the server system 115 hosts a distributed messaging service configured to provide workout reminders to users 120. In other embodiments, the server system 115 is configured to generate or output any other type of treatment, e.g., medical prescription information, advertising content, media, etc. The server system 115, in some embodiments, stores instructions for delivering such treatments, and/or user data such as subscription information, profile information, preference information, payment information, etc. The server system 115, in some cases, is configured to interact, e.g., via an API or the like, with the user device 105 in order to provide such treatments, e.g., via a push notification or the like. The server system 115, in some cases, is configured to interact, e.g., via an API or the like, with the developer device 110 in order to obtain a protocol for a treatment, subject data for directing a treatment, or the like, or to provide response data, usage data for the good or service hosted by the server system 115, or the like.

For instance, a user 120 may subscribe for a messaging service, e.g., via a user device 105. The user 120, in some instances, uses an electronic application operating on the user device 105 to setup a profile or account that is hosted by or in communication with the server system 115. The server system 115 determines a messaging protocol for the user 120. In an example, the server system 115 determines whether the user 120 has been selected for participation in a trial, e.g., via an API interaction with the trial system 135 or the developer device 110 or the like, and setup and implement a messaging protocol as appropriate. The server system 115 then implements the messaging protocol to provide messages to the user device 105 as directed. As discussed in further detail below, in various embodiments, the server system 115 interacts with or receives instructions from other components of the environment 100 that modify how the server system 115 operates, e.g., how messaging is provided to the user 120.

In various embodiments, the electronic network 130 is a wide area network ("WAN"), a local area network ("LAN"), personal area network ("PAN"), or the like. In some embodiments, electronic network 130 includes the Internet, and information and data provided between various systems occurs online. "Online" means connecting to or accessing source data or information from a location remote from other devices or networks coupled to the Internet. Alternatively, "online" refers to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system so as to be accessible online, and that includes data configured to cause a program such as a web browser to perform operations such as send, receive, or process data, generate a visual display and/or an interactive interface, or the like.

As discussed in further detail below, the trial system 135, in embodiments, includes various modules, algorithms, or the like for performing various operations. While certain operations are described in association with one or more particular modules or algorithms, it should be understood that such operations may be distributed across any suitable number of algorithms or modules, and/or multiple operations may be performed by a single module or algorithm. In an example, the trial system 135 includes one or more modules or algorithms for setting up a micro-randomized trial, for running the trial, for monitoring the trial, for analyzing response data for the trial, for generating results data for the trial, or analyzing the results data for the trial. Setting up the trial may be based on, for example, information obtained from or via the developer device 110 or the like and, in examples, includes initializing a database for the trial, determining a sample size for the trial, generating or obtaining instructions for application of one or more treatments, populating a trial database, e.g., with subject data, performing an initial distribution of subjects into different cohorts, etc. Running the trial includes, for example, providing the server system 115 with appropriate treatment instructions for the subjects and/or causing different treatments to be applied to different subjects, redistributing the subjects into different cohorts, e.g., at each period of the trial, collecting response data from the subjects, etc. Generating and/or analyzing results includes, for example, sorting, modeling, and/or applying one or more statistical procedure to response data. Example procedures include determining one or more trial times/dates at which the trial is to be evaluated for statistical significance (e.g., using group sequential analysis or the like), determining a main treatment effect, determining whether results are statistically significant (e.g., using generalized estimating equations), generating results output (e.g., a textual and/or visual representation of the results and/or analysis), etc.

In some embodiments, the trial system 135 includes or has access to a database or data lake 112 configured to act as a repository or source for data such as, data associated with a trial, data obtained via the user interface of the developer device 110, or data obtained from any other suitable source, e.g., treatment data or protocol information, trial subject information, response data, subject engagement data, subject demographic data, etc. In some embodiments, such data may be stored and/or accessed by one or more other components of the environment 100, such as the developer device 110, the server system 115, or the like.

In some embodiments, treatment data or protocol information includes, for example, contents of a treatment, e.g., a message or series of messages, a prescription or course, a directed interaction or series of interactions or appointments, delivery of a good, etc. In some instances, a treatment has multiple stages, e.g., a series of sequential messages, or includes a combination of options, such as a workout reminder message every day and a web meeting with a trainer once a week.

In some embodiments, treatment data or protocol information includes criteria or conditions for providing one or more aspects of the treatment. In an example, provision of a workout reminder message is associated with a criterion that a subject is not currently located at a gym (e.g., based on location data from the subject's user device 105). Other example criteria in various embodiments includes, for example, message or treatment frequency, indications of user activity or location, historical actions taken by the subject 120, an indication of notification fatigue for the subject 120, etc. In an example, a protocol includes an instruction that a reminder message not be sent if the subject has takin a particular action recently or with a threshold amount of frequency. In another example, a protocol includes an instruction not to send a reminder message in response to determining that the subject 120 is traveling away from home, to weather conditions not being amiable to the recommended action, to determining that the subject 120 has cancelled a gym membership, has a record of an illness or doctor visit, has a scheduling conflict, etc.

Although depicted as separate components in FIG. 1, it should be understood that a component or portion of a component in the environment 100 may, in some embodiments, be integrated with or incorporated into one or more other components. For example, a portion of the server system 115 is integrated into the trial system 135, or the like. In another example, a portion of the server system 115 is integrated into the user device 105, or vice versa. In some embodiments, operations or aspects of one or more of the components discussed above are distributed amongst one or more other components. Any suitable arrangement and/or integration of the various systems and devices of the environment 100 is usable in various embodiments. In one embodiment, one or more components of the environment are implemented as a cloud service or at least partially on a cloud environment, e.g., the server system 115, the trial system 135, etc.

In the methods below, various acts are described as performed or executed by a component from the environment 100 of FIG. 1, such as the trial system 135, the server system 115, the developer device 110, the user device 105, or components thereof. However, it should be understood that in various embodiments, various components of the computing environment 100 discussed above may execute instructions or perform acts including the acts discussed below. Moreover, an operation described as implemented by a particular component may also be understood to refer to execution of that operation by a corresponding module or algorithm, e.g., by one or more processors associated with that component or others. Further, it should be understood that in various embodiments, various steps may be added, omitted, and/or rearranged in any suitable manner.

Figure 2:
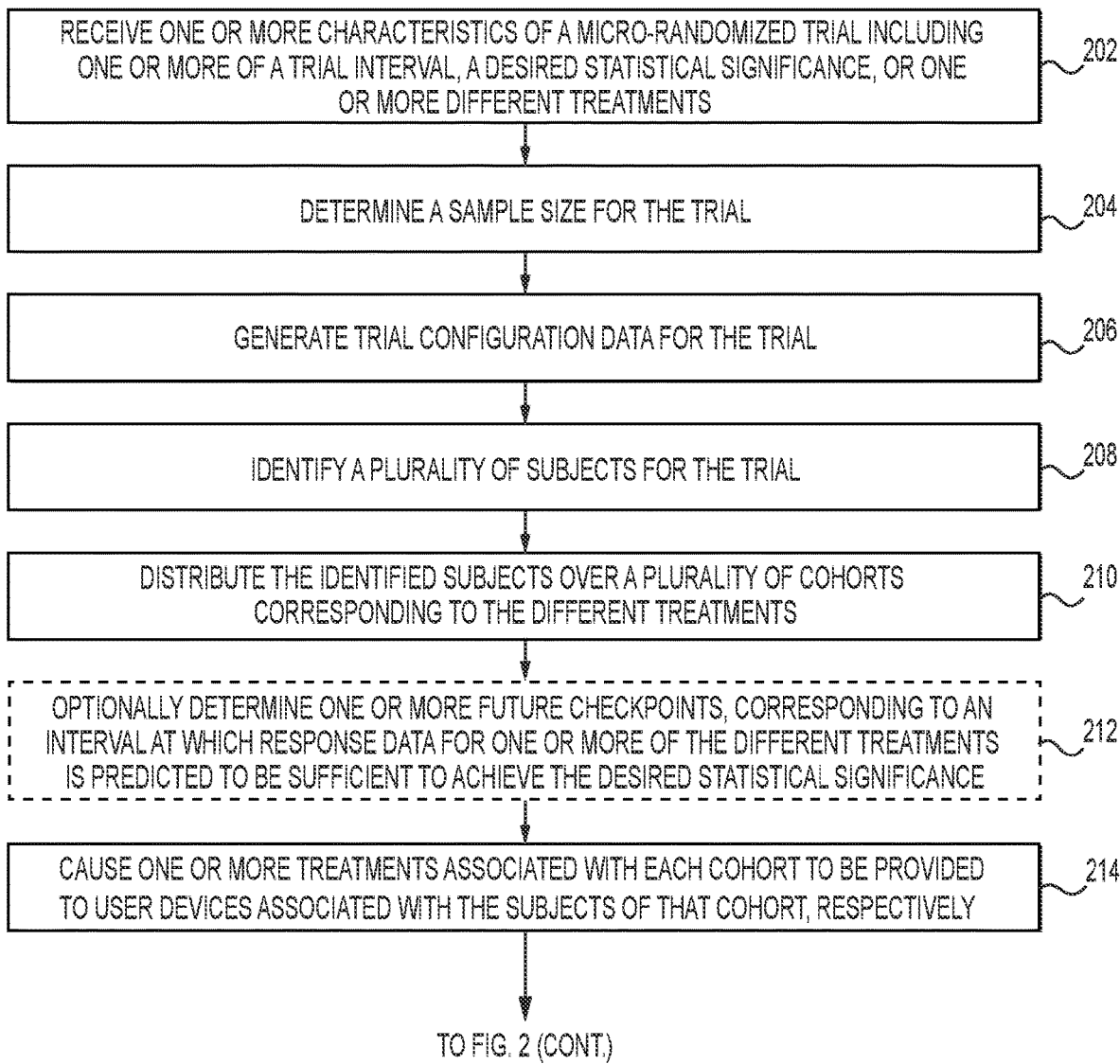
FIG. 2 depicts an example embodiment of a method for implementing a micro-randomized trial, according to one or more embodiments.
Figure 2:
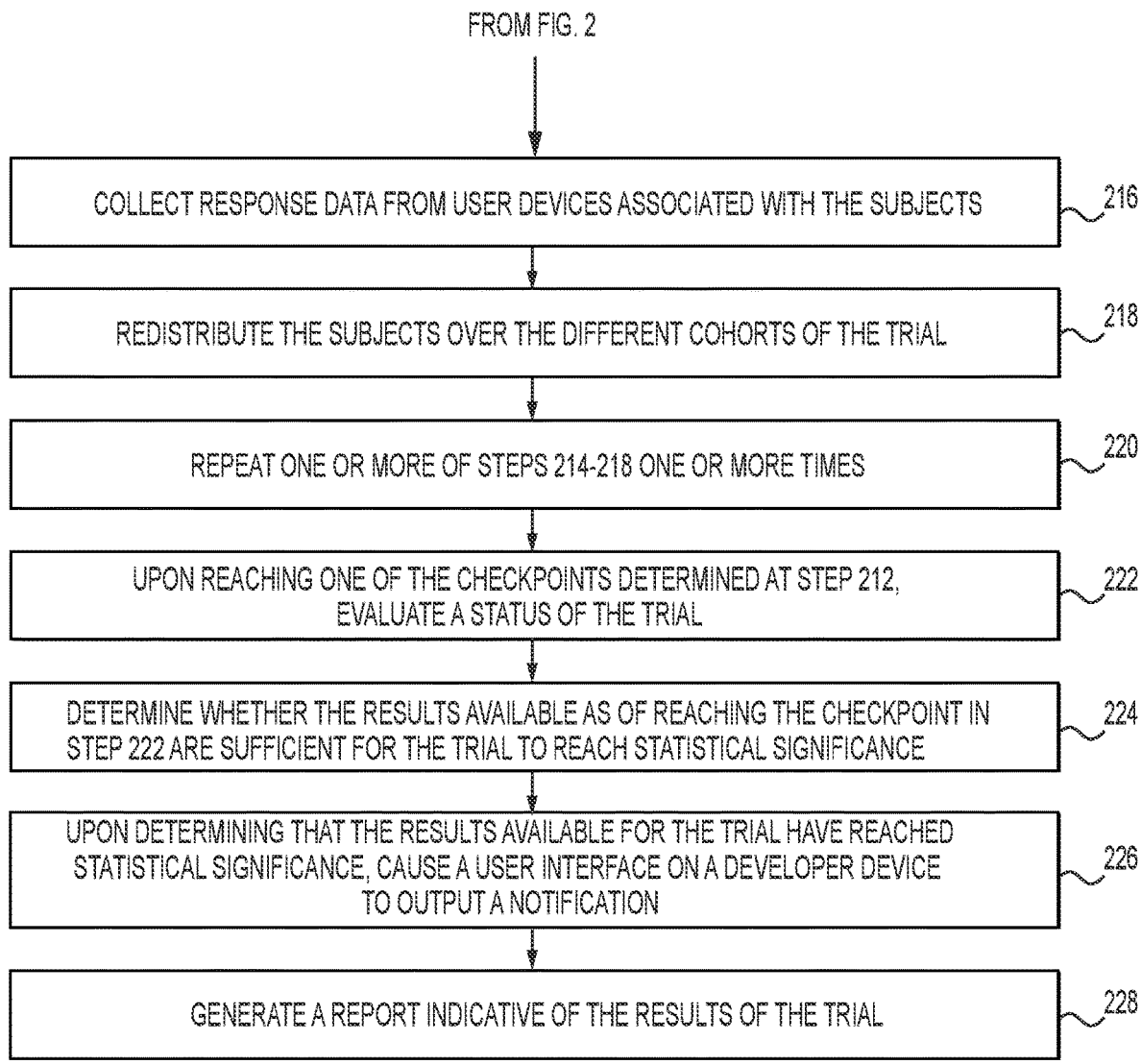

FIG. 2 illustrates an example process for implementing a micro-randomized trial, according to one or more aspects of this disclosure. A developer 125 or an associated entity may desire to understand the effectiveness for different options in a provided good or service. In some instances, the good or service may already be provided, and thus a comparison is desired between an existing practice, e.g., a control, and one or more different options. In some instances the good or service is not yet available, and thus a comparison is desired between a plurality of different options. The comparison may include implementation of a micro-randomized trial. In a particular example, a distributed messaging platform may be hosted on a server system 115, and may follow a protocol to provide reminder messages to one or more user devices, e.g., that are associated with users subscribed via a reminder application. The reminder messages may include causing the user devices 105 to display push notifications including the messages.

To implement the trial, the developer 125 accesses a user interface of a developer device 110 that is in communication with a trial system 135, e.g., via an API. At step 202, the interface receives one or more characteristics of the trial, e.g., a name, a start date/time, one or more experimental options to be used as treatments (with or without an option corresponding to an existing protocol as a control), as well as other information such as criteria or protocol for different treatments, number of cohorts for the trial, distribution of treatment options for the different cohorts, criteria or protocol for how subjects are to be distributed across the different cohorts, statistical significance or power desired for results of the trial, a period of time defining an interval between redistributions of subjects across the cohorts, etc. In various embodiments, the interval is daily, weekly, monthly, or any other suitable period of time. Further aspects of the redistributions are discussed below.

Portions of such information, in various embodiments, are preset, user provided, determined automatically, determined randomly, or combinations thereof. In some embodiments, such data includes a vector for each cohort that defines the treatment options associated with that cohort as well as a value for a probability that a subject will be distributed into that cohort.

At step 204, the trial system 135 determines a sample size for the trial, e.g., based on the one or more characteristics received in step 202. The sample size, in some embodiments, is a quantity of subjects needed for results of the trial to obtain the desired statistical power or significance. In some embodiments, the trial system 135 is further configured to determine a number of intervals needed for running the trial. In an example, embodiment, the sample size and/or extent of the trial is determined via a F-distribution or the like, e.g., based on a non-centrality parameter that accounts for hazard or expected availability, a proximal or time varying treatment effect, mixed effect parameters, etc.

At step 206, the trial system 135 generates trial configuration data, e.g., based on the received characteristics from step 202 and/or the sample size and/or timing determined from step 204, and output the trial configuration data. In an example, the trial system 135 one or more of causes the user interface of the developer device 110 to output a display of one or more aspects of the trial configuration data, or stores the trial configuration data in the database 112, or the like.

At step 208, the trial system 135 identifies a plurality of subjects for the trial, e.g., based on the sample size determined at step 204. In some embodiments, the trial configuration data includes criteria for selection of subjects. In some embodiments, the trial system 135, in order to identify one or more user devices 105 for subjects 120 for the trial, accesses or interacts with the server system 115. In an example, the server system 115 includes profile information for subscribed users that is compared against trial subject criteria to identify subjects 120 for the trial.

At step 210, the trial system 135 distributes the identified subjects 120 over the plurality of cohorts for the trial. In an example, each time the trial system 135 distributes subjects 120 across cohorts, e.g., in the initial distribution in step 210 and in future redistributions discussed below, the trial system 135 determines a respective probability for each subject 120, and then determine a respective cohort for the subject 120 based on the determined respective probability. In some embodiments, the respective probability accounts for cohort criteria. In some embodiments, the respective probability includes a constant (e.g., so that the chances of falling into each cohort remain the same across different distributions), a time-varying function (e.g., so that the chances of falling into different cohorts changes according to the function over time), or any other suitable factor associated with the subject 120 and/or the trial. In one example, the respective probability is based on a statistical procedure or algorithm, such as a Thompson sampling bandit algorithm, e.g., such that in future redistributions as discussed below, subjects are gradually biased toward more effective treatments.

At step 212, the trial system 135 determines one or more future checkpoints, e.g., dates/times corresponding to an interval at which response data for one or more of the different treatments is predicted to be sufficient to achieve the desired statistical significance or power for the trial. In some embodiments, the trial system 135 updates the determination of the checkpoints, e.g., based on one or more of a number of subjects 120 remaining active in the trial, engagement rates of the subjects 120, or the like.

At step 214, the trial system 135 causes one or more treatments associated with each cohort to be provided to user devices 105 associated with the subjects of that cohort, respectively. In one example, the trial system 135 identifies a treatment procedure or protocol for each subject 120 to the server system 115, and the server system 115 implements such procedure or protocol. As noted above, a treatment may have multiple stages or branches, which may have one or more criteria. In other words, each treatment may range from a singular act to a campaign with multiple decision points, but whereby the same procedure or logic is applied to each subject 120 in a same cohort. In some embodiments, treatments to subjects 120 are provided in real time and/or streamed to the user device 105.

At step 216, the trial system 135 collects response data from user devices 105 associated with the subjects 120. In some embodiments, collected response data is aggregated by trial interval. In some embodiments, collected response data is received in real time, may be streamed to the database 112, or the like. In some embodiments, the trial system 135 is configured to request response data from the user devices 150. In some embodiments, an electronic application or program operating on the user devices 105 are configured to periodically provide response data to the trial system 135 and/or are configured to provide response data in response to an interaction with the subject 120. In an example, the user device 105 is configured to automatically provide response data in response to the subject 120 one or more of engaging with a message, taking or reporting completion of a particular action, being in a particular location, etc. Response data, in an example, includes one or more of an identification of the subject, an identification of the cohort or of the treatment provided, an index value indicative of whether or when a particular treatment was provided, data indicative of engagement of the subject 120 with the treatment, an availability of the subject 120 and/or the user device 105 when the treatment was provided (e.g., was the user device 105 on and in service), an indication of whether the subject 120 received the treatment, data associated with reporting or an indication of a response or outcome from the treatment, etc.

At step 218, the trial system 135 redistributes the subjects 120 over the different cohorts of the trial. As noted above, such redistribution is performed, in an example, by determining a respective probability for each subject 120, and assigning the subject 120 into a cohort based on the determined respective probability. In some embodiments, performing the redistribution includes updating the function or procedure for determining the respective probability, e.g., based on time passed in the trial or other criteria. In an example, the modification is based on Thompson bandit sampling or another effect-based algorithm. In an example, results data from a preceding interval includes treatment effectiveness data that is usable to modify the criteria for selection across the different cohorts. Positive response for a treatment in a prior interval causes it to be more likely for subjects 120 to be distributed into that cohort in a next interval, or vice versa. In this manner, subjects 120 are gradually biased toward cohorts with better reported success.

At step 220, one or more of steps 214-218 are repeated one or more times. In other words, the distribution of subjects 120 into cohorts, the causing of the application of treatments, and the collecting of response data is repeated throughout the trial, e.g., over each successive interval of the trial. It should be understood, however, that in some embodiments, one or more of the steps 214-218 are performed concurrently. In an example, collection of response data continues throughout a trial, e.g., rather than being conducted as a discrete step at a discrete moment in time.

At step 222, the trial reaches one of the checkpoints determined at step 212, and the trial system 135 evaluates a status of the trial. In some embodiments, evaluating the status of the trial includes, for example, determining a mean treatment effect for the different treatments. In an example, determining the mean treatment effect for a treatment includes, for each result time step of the trial, isolating response data for subjects 120 that were available when a treatment was applied and then comparing responses from subjects 120 that received a treatment against responses from subjects 120 that did not. An example output of this determining includes a time-varying, causal effect quantification of the comparison between responses of subjects 120 that did and did not receive the treatment. In some embodiments, the output determined at each checkpoint is stored, e.g., in the database 112.

At step 224, the trial system 135 determines whether the results available as of reaching the checkpoint in step 222 are sufficient for the trial to reach statistical significance. In some embodiments, this determining includes using generalized estimating equations, or the like. Because trial results include data over time, e.g., time series data, and because subjects 120 are periodically moved to different cohorts, the results data may include at least some auto-correlation. For example, for a specific user, "Alice," it may be that an action taken by Alice at day t will be correlated with Alice's actions at day t−1 and/or her actions at day t+1. Generalized estimating equations enable determination of how much each instance of response data contributes statistically.

At step 226, upon determining that the results available for the trial have reached statistical significance, the trial system 135 causes the user interface on the developer device 110 to output a notification to the developer 125. In some embodiments, the user interface of the developer device 110 includes an interface element that, responsive to receiving the notification, is operable to transmit an instruction to the server system 115 to modify and/or conclude the trial. In an example, the notification indicates that a particular treatment from amongst the plurality of treatments is statistically predicted to be more effective than others, and the developer is enabled to operate the interface element to roll out that treatment to all subjects 120, rather than forcing subjects 120 to finish the trial with application of less effective treatments.

At step 228, the trial system 135 generates a report indicative of the results of the trial. Such a report, in various embodiments, includes content such as, for example, an impact or near-term effectiveness of different treatments, an impact of characteristics of the subjects 120 and/or time-varying factors on the effectiveness of the different treatments, long term effectiveness of the different treatments, etc. In various embodiments, such content is generated automatically and/or via human analysis, e.g., by performing statistical examination of the results. In one aspect, effectiveness for a treatment is determined at various granularities, e.g., just after application, within an hour, five hours, a day, a week, over time, etc. In another aspect, trends may be identified. In an example, correlations between long term behavior changes in the subjects 120 and a sequence of different treatments are identified.

Figure 3:
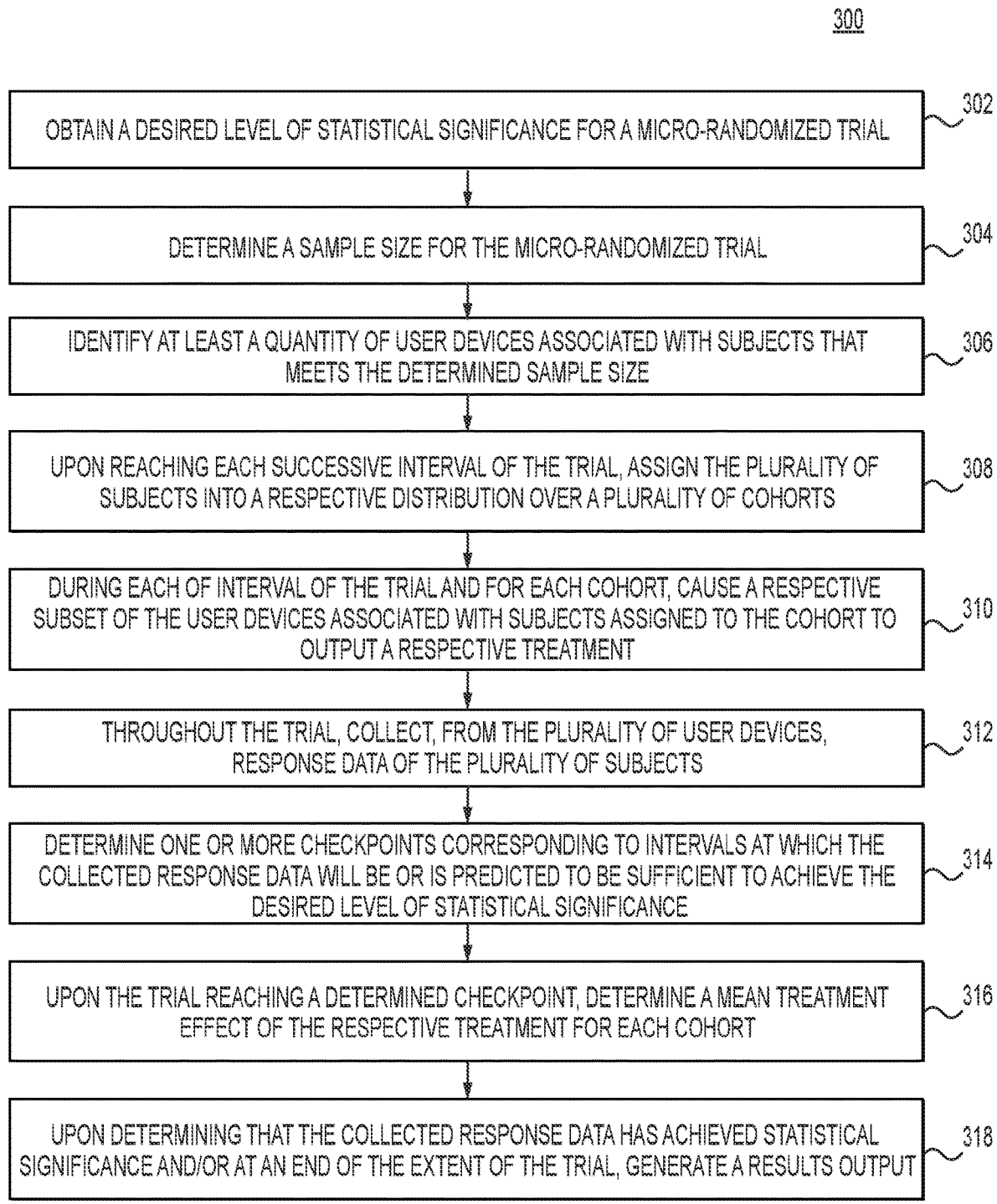
FIG. 3 depicts another example embodiment of a method for implementing a micro-randomized trial, according to one or more embodiments

FIG. 3 depicts another example embodiment of a process for implementing a micro-randomized trial, according to one or more aspects of this disclosure. A developer 125 or an associated entity may desire to conduct a micro-randomized trial, e.g., in order to evaluate one or more options for providing a good or service. At step 302, a trial system 135 obtains, e.g., via a user interface of a developer device 110 or a preset value or the like, a desired level of statistical significance for the trial. At step 304, the trial system 135 determines a sample size for the micro-randomized trial, e.g., based on the desired level of statistical significance and/or other factors.

At step 306, the trial system 135 identifies, e.g., via interaction with a server system 115 over an electronic network, at least a quantity of user devices 105 associated with subjects 120 that meets the determined sample size. In an example, subjects 120 are identified according to one or more criteria for the trial, e.g., subscribed to be provided with the good or service associated with the trial, agreed to opt in to the trial, available for the trial, in a geographical region approved for the trial, over a threshold minimum age, etc. The trial system 135, in an embodiment, additionally sets or obtains one or more characteristics for the trial such as, for example, a start day/time, a period of time to be used as a fixed interval for the trial, a number of intervals and/or an extent for the trial.

At step 308, and upon reaching each successive interval of the trial, the trial system 135 assigns the plurality of subjects 120 into a respective distribution over a plurality of cohorts. In other words, the assignment of any particular subject 120 is re-assigned at each successive interval. Each cohort is associated with a different treatment or combination of treatments, e.g., such that the treatment applied within a cohort is different from the treatments applied in each other.

In some embodiments, the assignment and/or re-assignment is performed randomly. In some embodiments, the likelihood of being assigned to each cohort is the same as any other. In some embodiments, the likelihood of being assigned to one or more cohorts varies over time, e.g., based on a predefined time-varying function or an algorithm or the like. In some embodiments, the re-assigning of the plurality of subjects 120 into the respective distribution over the plurality of cohorts is performed according to Thompson bandit sampling, or the like.

At step 310, and during each of the intervals of the trial, the trial system 135 causes, for each cohort, a respective subset of the user devices 105 associated with subjects 120 assigned to the cohort to output a respective treatment. In some embodiments, the trial system 135 provides, for example, instructions to the server system 115 for applying different treatments to different subjects 120, whereby the server system 115 causes user devices 105 of the subjects 120 to generate, output, direct, and/or apply the corresponding treatments to the subjects 120. It should be understood, however, that this arrangement is exemplary only, and that any suitable arrangement may be used. For example, in some embodiments, the trial system 135 communicates with the user devices 105, e.g., without a server system intermediary. In some embodiments, the trial system 135 directs another system or device to schedule delivery of a treatment at a later time. In an example, the trial system 135 causes a user device 105 to generate a push notification at various times without requiring the trial system 135 to communicate with the user device 105 at each instance. As a result of this step, as the plurality of subjects 120 are re-assigned to different cohorts across the plurality of intervals, the user devices 105 of the plurality of subjects 120 outputs different treatments corresponding to the different cohorts.

At step 312, and throughout the trial, the trial system 135 collects, from the plurality of user devices 105, response data of the plurality of subjects 120. In some embodiments, the collected response data is indexed by time step for the trial, e.g., by hour, day, week, etc. The time step for collecting data, in some embodiments, is an extent of time that is less than the interval for re-distributing the subjects 120 across the different cohorts. In some embodiments, the response data is collected in real time, and/or is be streamed from the user devices 105, e.g., to a database 112 or the like.

The response data, in some embodiments, includes, for example, for each time step, one or more of subject engagement data, subject availability data, assigned treatment data, or near-term outcome data. The trial system 135, in an embodiment, bins or indexes response data, e.g., in a relational database, via one or more characteristic such as time step, interval, subject 120, treatment, cohort, etc.

At step 314, the trial system 135 determines one or more checkpoints, e.g., one or more future intervals at which the collected response data will be or is predicted to be sufficient to achieve the desired level of statistical significance. In an example, the trial system 135 employs one or more algorithms to determine a checkpoint, such as group sequential analysis. In some embodiments, the trial system 135 is configured to periodically and/or continuously re-evaluate the determination of the one or more checkpoints, e.g., based on a change or trend for subject 120 engagement.

At step 316, upon the trial reaching a determined checkpoint, the trial system 135 determines a mean treatment effect of the respective treatment for each cohort. However, in some embodiments, instead of or in additional to determining and using checkpoints, the trial system 135 is configured to determine the mean treatment effects of the different treatments periodically, continuously, and/or on receiving a request from the developer 125 via the developer device 110, or the like.

At step 318, upon determining that the collected response data has achieved statistical significance and/or at an end of the extent of the trial, the trial system 135 generates a results output. The results output includes, for example, a notification delivered to the developer device 110 indicating that the results for at least one treatment has reached statistical significance. The results output includes, in another example, a report indicative of results of the micro-randomized trial. In another example, the report includes data indicative of an amount of impact or effectiveness of the different treatments, and/or impact on effectiveness of the treatments from one or more time-varying factors. The report, in some embodiments, includes trends, analysis, and/or conclusions that may be drawn from the results data, which in different embodiments are generated automatically via one or more algorithms and/or with the aid of a human investigator.

Below, additional example embodiments are provided.

Embodiment 1

A distributed messaging platform for providing a micro-randomized trial may include: at least one trial system that includes: at least one memory storing instructions; and at least one processor operatively connected to the at least one memory, and configured to execute the instructions to perform operations for executing the micro-randomized trial, including: identify, over an electronic network operatively connected to the at least one trial system, a plurality of user devices that are associated with a plurality of subjects for a micro-randomized trial; and at each of a plurality of fixed intervals: assign the plurality of subjects into a respective distribution over a plurality of cohorts, such that the plurality of subjects are re-assigned at each fixed interval; for each cohort, cause a respective subset of the user devices associated with subjects assigned to the cohort to output a respective treatment, the treatment for each cohort being different from each other; and collect, from the plurality of user devices, response data of the plurality of subjects; such that, as the plurality of subjects are re-assigned to different cohorts across the plurality of fixed intervals, the user devices of the plurality of subjects output different treatments corresponding to the different cohorts.

Embodiment 2

The distributed messaging platform of embodiment 1, wherein the operations further include: obtaining a level of desired level of statistical significance for the micro-randomized trial; and determining a sample size for the micro-randomized trial based on the desired level of statistical significance, wherein at least a quantity of user devices meeting the determined sample size is identified.

Embodiment 3

The distributed messaging platform of claim 1, wherein the re-assigning of the plurality of subjects into the respective distribution over the plurality of cohorts is performed according to Thompson sampling.

Embodiment 4

The distributed messaging platform of claim 1, wherein collecting the response data collected from the plurality of user devices includes streaming respective response data from each of the plurality of devices in real time to a database or data lake.

Embodiment 5

The distributed messaging platform of claim 1, wherein the operations further include: determining one or more future intervals at which the collected response data will be sufficient to achieve a pre-determined level of statistical significance.

Embodiment 6

The distributed messaging platform of claim 1, wherein the operations further include: determining a mean treatment effect of the respective treatment for each cohort.

Embodiment 7

The distributed messaging platform of claim 1, wherein the operations further include: causing a user device associated with a trial operator to output a notification in response to a determination that at least one respective treatment assigned to one of the cohorts is statistically significant.

Embodiment 8

The distributed messaging platform of claim 1, wherein the operations further include: generating a report indicative of results of the micro-randomized trial.

Embodiment 9

The distributed messaging platform of claim 8, wherein the results include: data indicative of an amount of impact on effectiveness from one or more time-varying factors associated with providing the respective treatments to the plurality of subjects.

Embodiment 10

The distributed messaging platform of claim 1, wherein the response data collected from each subject includes subject engagement data, subject availability data, assigned treatment data, and near-term outcome data.

Embodiment 11

A computer-implemented method of using a distributed messaging platform to provide a micro-randomized trial, may include: identifying, over an electronic network, a plurality of user devices that are associated with a plurality of subjects for a micro-randomized trial; and at each of a plurality of fixed intervals: assigning the plurality of subjects into a respective distribution over a plurality of cohorts, such that the plurality of subjects are re-assigned at each fixed interval; for each cohort, causing a respective subset of the user devices associated with subjects assigned to the cohort to output a respective treatment, the treatment for each cohort being different from each other; and collecting, from the plurality of user devices, response data of the plurality of subjects; such that, as the plurality of subjects are re-assigned to different cohorts across the plurality of fixed intervals, the user devices of the plurality of subjects output different treatments corresponding to the different cohorts.

Embodiment 12

The computer-implemented method of claim 11, further comprising: obtaining a level of desired level of statistical significance for the micro-randomized trial; and determining a sample size for the micro-randomized trial based on the desired level of statistical significance, wherein at least a quantity of user devices meeting the determined sample size is identified.

Embodiment 13

The computer-implemented method of claim 11, wherein the re-assigning of the plurality of subjects into the respective distribution over the plurality of cohorts is performed according to Thompson sampling.

Embodiment 14

The computer-implemented method of claim 11, wherein collecting the response data collected from the plurality of user devices includes streaming respective response data from each of the plurality of devices in real time to a database or data lake.

Embodiment 15

The computer-implemented method of claim 11, further comprising: determining one or more future intervals at which the collected response data will be sufficient to achieve a pre-determined level of statistical significance.

Embodiment 16

The computer-implemented method of claim 11, further comprising: determining a mean treatment effect of the respective treatment for each cohort.

Embodiment 17

The computer-implemented method of claim 11, further comprising one or more of: causing a user device associated with a trial operator to output a notification in response to a determination that at least one respective treatment assigned to one of the cohorts is statistically significant; or generating a report indicative of results of the micro-randomized trial.

Embodiment 18

The computer-implemented method of claim 17, wherein the results include: data indicative of an amount of impact on effectiveness from one or more time-varying factors associated with providing the respective treatments to the plurality of subjects.

Embodiment 19

The computer-implemented method of claim 11, wherein the response data collected from each subject includes subject engagement data, subject availability data, assigned treatment data, and near-term outcome data.

Embodiment 20

A non-transitory computer-readable medium comprising instructions for using a distributed messaging platform to provide a micro-randomized trial, the instructions executable by at least one processor to perform operations. The operations may include: identifying, over an electronic network, a plurality of user devices that are associated with a plurality of subjects for a micro-randomized trial; and at each of a plurality of fixed intervals: assigning the plurality of subjects into a respective distribution over a plurality of cohorts, such that the plurality of subjects are re-assigned at each fixed interval; for each cohort, causing a respective subset of the user devices associated with subjects assigned to the cohort to output a respective treatment, the treatment for each cohort being different from each other; and collecting, from the plurality of user devices, response data of the plurality of subjects; such that, as the plurality of subjects are re-assigned to different cohorts across the plurality of fixed intervals, the user devices of the plurality of subjects output different treatments corresponding to the different cohorts.

It should be understood that embodiments in this disclosure are exemplary only, and that other embodiments may include various combinations of features from other embodiments, as well as additional or fewer features. For example, while some of the embodiments above pertain to a micro-randomized trial operated in conjunction with a distributed messaging platform, any suitable micro-randomized trial with any suitable type or kind of treatment may be implements according to one or more aspects of this disclosure.

In general, any process or operation discussed in this disclosure that is understood to be computer-implementable, such as the processes illustrated in FIGS. 2 and 3, is performed by one or more processors of a computer system, such any of the systems or devices in the environment 100 of FIG. 1, as described above. A process or process step performed by one or more processors may also be referred to as an operation. The one or more processors are configured to perform such processes by having access to instructions (e.g., software or computer-readable code) that, when executed by the one or more processors, cause the one or more processors to perform the processes. The instructions are stored in a memory of the computer system. A processor is a central processing unit (CPU), a graphics processing unit (GPU), or any suitable types of processing unit.

A computer system, such as a system or device implementing a process or operation in the examples above, includes one or more computing devices, such as one or more of the systems or devices in FIG. 1. One or more processors of a computer system are included in a single computing device or distributed among a plurality of computing devices. A memory of the computer system includes the respective memory of each computing device of the plurality of computing devices.

Figure 4:
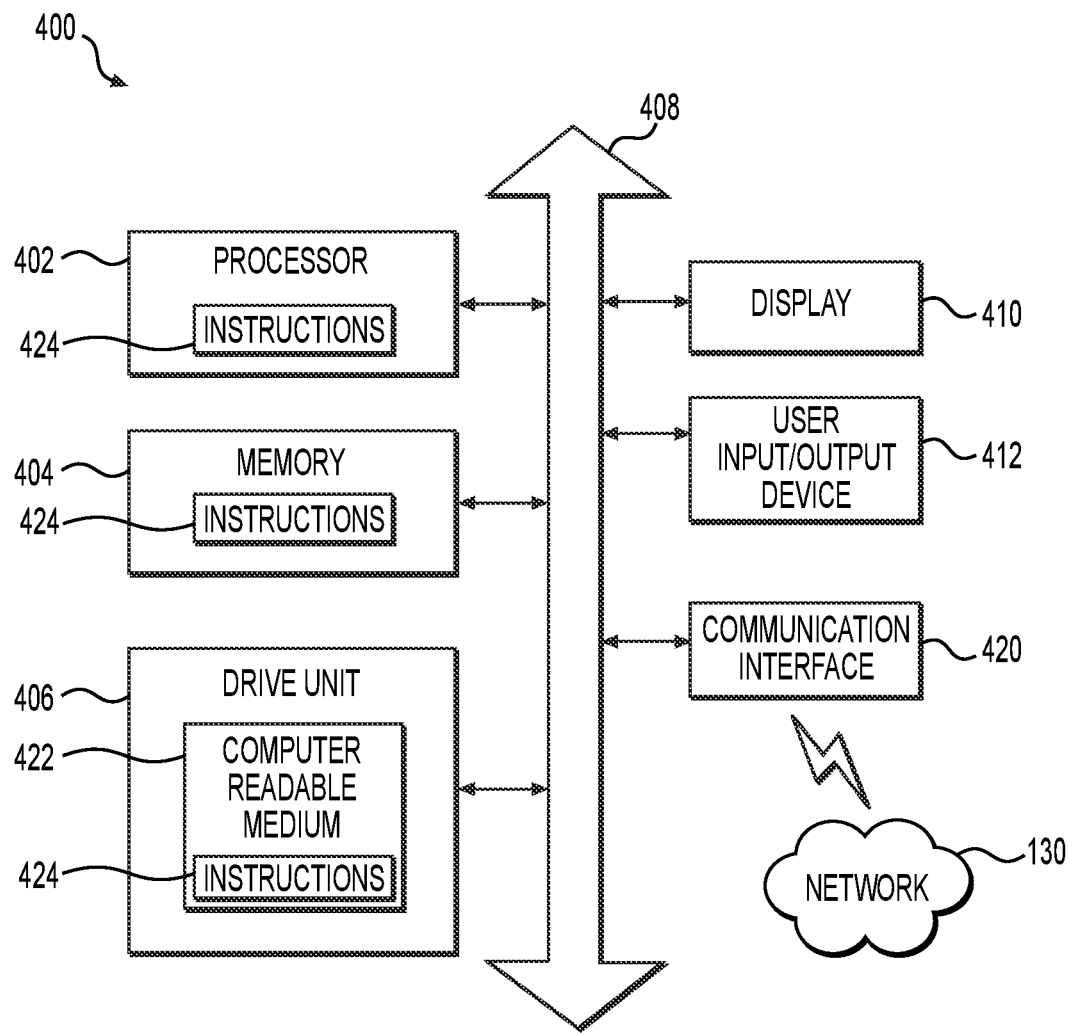
FIG. 4 depicts an example of a computing device, according to one or more embodiments.

FIG. 4 is a simplified functional block diagram of a computer 400 that is configured as a device for executing the methods of FIGS. 2 and 3, according to example embodiments of the present disclosure. For example, the computer 400 is configured as the trial system 135 and/or another system according to example embodiments of this disclosure. In various embodiments, any of the systems herein is a computer 400 including, for example, a data communication interface 420 for packet data communication. The computer 400 also includes a central processing unit ("CPU") 402, in the form of one or more processors, for executing program instructions. The computer 400 includes an internal communication bus 408, and a storage unit 406 (such as ROM, HDD, SDD, etc.) that may store data on a computer readable medium 422, although the computer 400 may receive programming and data via network communications. The computer 400 may also have a memory 404 (such as RAM) storing instructions 424 for executing techniques presented herein, although the instructions 424 are stored temporarily or permanently within other modules of computer 400 (e.g., processor 402 and/or computer readable medium 422). The computer 400 also includes input and output ports 412 and/or a display 410 to connect with input and output devices such as keyboards, mice, touchscreens, monitors, displays, etc. The various system functions are implemented in a distributed fashion on a number of similar platforms, to distribute the processing load. Alternatively, the systems is implemented by appropriate programming of one computer hardware platform.

Program aspects of the technology are thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that stores the software elements includes optical, electrical and electromagnetic waves, such as used across physical interfaces between local devices, through wired and optical landline networks and over various air-links. The physical elements that carry such waves, such as wired or wireless links, optical links, or the like, also is considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed embodiments are applicable to any environment, such as a desktop or laptop computer, an automobile entertainment system, a home entertainment system, etc. Also, the disclosed embodiments are applicable to any type of Internet protocol.

It should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

The present disclosure furthermore relates to the following aspects.

Clause 1. A distributed messaging platform for providing a micro-randomized trial, comprising: at least one trial system that includes: at least one memory storing instructions; and at least one processor operatively connected to the at least one memory, and configured to execute the instructions to perform operations for executing the micro-randomized trial, including: identifying, over an electronic network operatively connected to the at least one trial system, a plurality of user devices that are associated with a plurality of subjects for a micro-randomized trial; and at each of a plurality of fixed intervals: assigning the plurality of subjects into a respective distribution over a plurality of cohorts, such that the plurality of subjects are re-assigned at each fixed interval; for each cohort, causing a respective subset of the user devices associated with subjects assigned to the cohort to output a respective treatment, the treatment for each cohort being different from each other; and collecting, from the plurality of user devices, response data of the plurality of subjects; such that, as the plurality of subjects are re-assigned to different cohorts across the plurality of fixed intervals, the user devices of the plurality of subjects output different treatments corresponding to the different cohorts.

Clause 2. The distributed messaging platform of clause 1, wherein the operations further include: obtaining a level of desired level of statistical significance for the micro-randomized trial; and determining a sample size for the micro-randomized trial based on the desired level of statistical significance, wherein at least a quantity of user devices meeting the determined sample size is identified.

Clause 3. The distributed messaging platform of any of the preceding clauses, wherein the re-assigning of the plurality of subjects into the respective distribution over the plurality of cohorts is performed according to Thompson sampling.

Clause 4. The distributed messaging platform of any of the preceding clauses, wherein collecting the response data collected from the plurality of user devices includes streaming respective response data from each of the plurality of devices in real time to a database or data lake.

Clause 5. The distributed messaging platform of any of the preceding clauses, wherein the operations further include: determining one or more future intervals at which the collected response data will be sufficient to achieve a pre-determined level of statistical significance.

Clause 6. The distributed messaging platform of any of the preceding clauses, wherein the operations further include: determining a mean treatment effect of the respective treatment for each cohort.

Clause 7. The distributed messaging platform of any of the preceding clauses, wherein the operations further include: causing a user device associated with a trial operator to output a notification in response to a determination that at least one respective treatment assigned to one of the cohorts is statistically significant.

Clause 8. The distributed messaging platform of any of the preceding clauses, wherein the operations further include: generating a report indicative of results of the micro-randomized trial.

Clause 9. The distributed messaging platform of clause 8, wherein the results include: data indicative of an amount of impact on effectiveness from one or more time-varying factors associated with providing the respective treatments to the plurality of subjects.

Clause 10. The distributed messaging platform of any of the preceding clauses, wherein the response data collected from each subject includes subject engagement data, subject availability data, assigned treatment data, and near-term outcome data.

Clause 11. A computer-implemented method of using one or more processors of a distributed messaging platform to provide a micro-randomized trial, comprising: identifying, over an electronic network, a plurality of user devices that are associated with a plurality of subjects for a micro-randomized trial; and at each of a plurality of fixed intervals: assigning the plurality of subjects into a respective distribution over a plurality of cohorts, such that the plurality of subjects are re-assigned at each fixed interval; for each cohort, causing a respective subset of the user devices associated with subjects assigned to the cohort to output a respective treatment, the treatment for each cohort being different from each other; and collecting, from the plurality of user devices, response data of the plurality of subjects; such that, as the plurality of subjects are re-assigned to different cohorts across the plurality of fixed intervals, the user devices of the plurality of subjects output different treatments corresponding to the different cohorts.

Clause 12. The computer-implemented method of clause 11, further comprising: obtaining a level of desired level of statistical significance for the micro-randomized trial; and determining a sample size for the micro-randomized trial based on the desired level of statistical significance, wherein at least a quantity of user devices meeting the determined sample size is identified.

Clause 13. The computer-implemented method of any of clauses 11-12, wherein the re-assigning of the plurality of subjects into the respective distribution over the plurality of cohorts is performed according to Thompson sampling.

Clause 14. The computer-implemented method of any of clauses 11-13, wherein collecting the response data collected from the plurality of user devices includes streaming respective response data from each of the plurality of devices in real time to a database or data lake.

Clause 15. The computer-implemented method of claim any of clauses 11-14, further comprising: determining one or more future intervals at which the collected response data will be sufficient to achieve a pre-determined level of statistical significance.

Clause 16. The computer-implemented method of claim any of clauses 11-15, further comprising: determining a mean treatment effect of the respective treatment for each cohort.

Clause 17. The computer-implemented method of claim any of clauses 11-16, further comprising one or more of: causing a user device associated with a trial operator to output a notification in response to a determination that at least one respective treatment assigned to one of the cohorts is statistically significant; or generating a report indicative of results of the micro-randomized trial.

Clause 18. The computer-implemented method of clause 17, wherein the results include: data indicative of an amount of impact on effectiveness from one or more time-varying factors associated with providing the respective treatments to the plurality of subjects.

Clause 19. The computer-implemented method of any of clauses 11-18, wherein the response data collected from each subject includes subject engagement data, subject availability data, assigned treatment data, and near-term outcome data.

Clause 20. A non-transitory computer-readable medium comprising instructions for using a distributed messaging platform to provide a micro-randomized trial, the instructions executable by at least one processor to perform operations including: identifying, over an electronic network, a plurality of user devices that are associated with a plurality of subjects for a micro-randomized trial; and at each of a plurality of fixed intervals: assigning the plurality of subjects into a respective distribution over a plurality of cohorts, such that the plurality of subjects are re-assigned at each fixed interval; for each cohort, causing a respective subset of the user devices associated with subjects assigned to the cohort to output a respective treatment, the treatment for each cohort being different from each other; and collecting, from the plurality of user devices, response data of the plurality of subjects; such that, as the plurality of subjects are re-assigned to different cohorts across the plurality of fixed intervals, the user devices of the plurality of subjects output different treatments corresponding to the different cohorts.

What is claimed is:

1. A distributed messaging platform for providing a micro-randomized trial, comprising:
at least one memory storing instructions; and
one or more processors operatively connected to the at least one memory, and configured to execute the instructions to perform operations for executing the micro-randomized trial, including:
identifying, over an electronic network operatively connected to the one or more processors, a plurality of user devices that are associated with a plurality of subjects for the micro-randomized trial; and
at each of a plurality of fixed intervals:
assigning the plurality of subjects into a respective distribution over a plurality of cohorts at each fixed interval, wherein the assigning includes:
in a first interval, randomly assigning each subject into a respective cohort; and
in each successive interval:
collecting, from the plurality of user devices, response data from the plurality of subjects;
determining a respective assignment probability for each cohort that accounts for a criteria that has been modified based on the response data; and
re-assigning the plurality of subjects into the respective cohorts based on the modified criteria, wherein the re-assigning of each subject is randomized based on the determined respective assignment probabilities of the plurality of cohorts, and is independent of the response data from the subject;
wherein, as the plurality of subjects are re-assigned to the respective cohorts across the plurality of fixed intervals, the user devices of the plurality of subjects are caused to output respective treatments corresponding to the respective cohorts.

2. The distributed messaging platform of claim 1, wherein the operations further include:
obtaining a desired level of statistical significance for the micro-randomized trial; and
determining a sample size for the micro-randomized trial based on the desired level of statistical significance, wherein at least a quantity of user devices meeting the determined sample size is identified.

3. The distributed messaging platform of claim 1, wherein the re-assigning of the plurality of subjects into the respective cohorts is performed according to Thompson sampling.

4. The distributed messaging platform of claim 1, wherein collecting the response data collected from the plurality of user devices includes streaming respective response data from each of the plurality of devices in real time to a database or data lake.

5. The distributed messaging platform of claim 1, wherein the operations further include:
determining one or more future intervals at which the collected response data will be sufficient to achieve a pre-determined level of statistical significance.

6. The distributed messaging platform of claim 1, wherein the operations further include:
determining a mean treatment effect of the respective treatment for each cohort.

7. The distributed messaging platform of claim 1, wherein the operations further include:
causing a user device associated with a trial operator to output a notification in response to a determination that at least one respective treatment assigned to one of the cohorts is statistically significant.

8. The distributed messaging platform of claim 1, wherein the operations further include:
generating a report indicative of results of the micro-randomized trial.

9. The distributed messaging platform of claim 8, wherein the results include:
data indicative of an amount of impact on effectiveness from one or more time-varying factors associated with providing the respective treatments to the plurality of subjects.

10. The distributed messaging platform of claim 1, wherein the response data collected from each subject includes subject engagement data, subject availability data, assigned treatment data, and near-term outcome data.

11. A computer-implemented method of using one or more processors of a distributed messaging platform to provide a micro-randomized trial, comprising:
identifying, over an electronic network, a plurality of user devices that are associated with a plurality of subjects for a micro-randomized trial; and
at each of a plurality of fixed intervals:
assigning the plurality of subjects into a respective distribution over a plurality of cohorts, such that the plurality of subjects are re-assigned at each fixed interval, wherein the assigning includes:
in a first interval, randomly assigning each subject into a respective cohort; and
in each successive interval:
collecting, from the plurality of user devices, response data of the plurality of subjects;
determining a respective assignment probability for each cohort that accounts for a criteria that has been modified based on the response data; and
re-assigning the plurality of subjects into the respective cohorts based on the modified criteria, wherein the re-assigning of each subject is randomized based on the determined respective assignment probabilities of the plurality of cohorts, and is independent of the response data from the subject;
wherein, as the plurality of subjects are re-assigned to the respective cohorts across the plurality of fixed intervals, the user devices of the plurality of subjects are caused to output respective treatments corresponding to the respective cohorts.

12. The computer-implemented method of claim 11, further comprising:
obtaining a desired level of statistical significance for the micro-randomized trial; and
determining a sample size for the micro-randomized trial based on the desired level of statistical significance, wherein at least a quantity of user devices meeting the determined sample size is identified.

13. The computer-implemented method of claim 11, wherein the re-assigning of the plurality of subjects into the respective cohorts is performed according to Thompson sampling.

14. The computer-implemented method of claim 11, wherein collecting the response data collected from the plurality of user devices includes streaming respective response data from each of the plurality of devices in real time to a database or data lake.

15. The computer-implemented method of claim 11, further comprising:
determining one or more future intervals at which the collected response data will be sufficient to achieve a pre-determined level of statistical significance.

16. The computer-implemented method of claim 11, further comprising:
determining a mean treatment effect of the respective treatment for each cohort.

17. The computer-implemented method of claim 11, further comprising one or more of:
causing a user device associated with a trial operator to output a notification in response to a determination that at least one respective treatment assigned to one of the cohorts is statistically significant; or
generating a report indicative of results of the micro-randomized trial.

18. The computer-implemented method of claim 17, wherein the results include:
data indicative of an amount of impact on effectiveness from one or more time-varying factors associated with providing the respective treatments to the plurality of subjects.

19. The computer-implemented method of claim 11, wherein the response data collected from each subject includes subject engagement data, subject availability data, assigned treatment data, and near-term outcome data.

20. At least one non-transitory computer-readable medium comprising instructions for using a distributed messaging platform to provide a micro-randomized trial, the instructions executable by one or more processor to perform operations including:
identifying, over an electronic network, a plurality of user devices that are associated with a plurality of subjects for a micro-randomized trial; and
at each of a plurality of fixed intervals:
assigning the plurality of subjects into a respective distribution over a plurality of cohorts, such that the plurality of subjects are re-assigned at each fixed interval, wherein the assigning includes:
in a first interval, randomly assigning each subject into a respective cohort; and
in each successive interval:
collecting, from the plurality of user devices, response data from the plurality of subjects;
determining a respective assignment probability for each cohort that accounts for a criteria that has been modified based on the response data; and
re-assigning the plurality of subjects into the respective cohorts based on the modified criteria, wherein the re-assigning of each subject is randomized based on the determined respective assignment probabilities of the plurality of cohorts, and is independent of the response data from the subject;
wherein, as the plurality of subjects are re-assigned to the respective cohorts across the plurality of fixed intervals, the user devices of the plurality of subjects are caused to output respective treatments corresponding to the respective cohorts.

* * * * *